Figure 1:
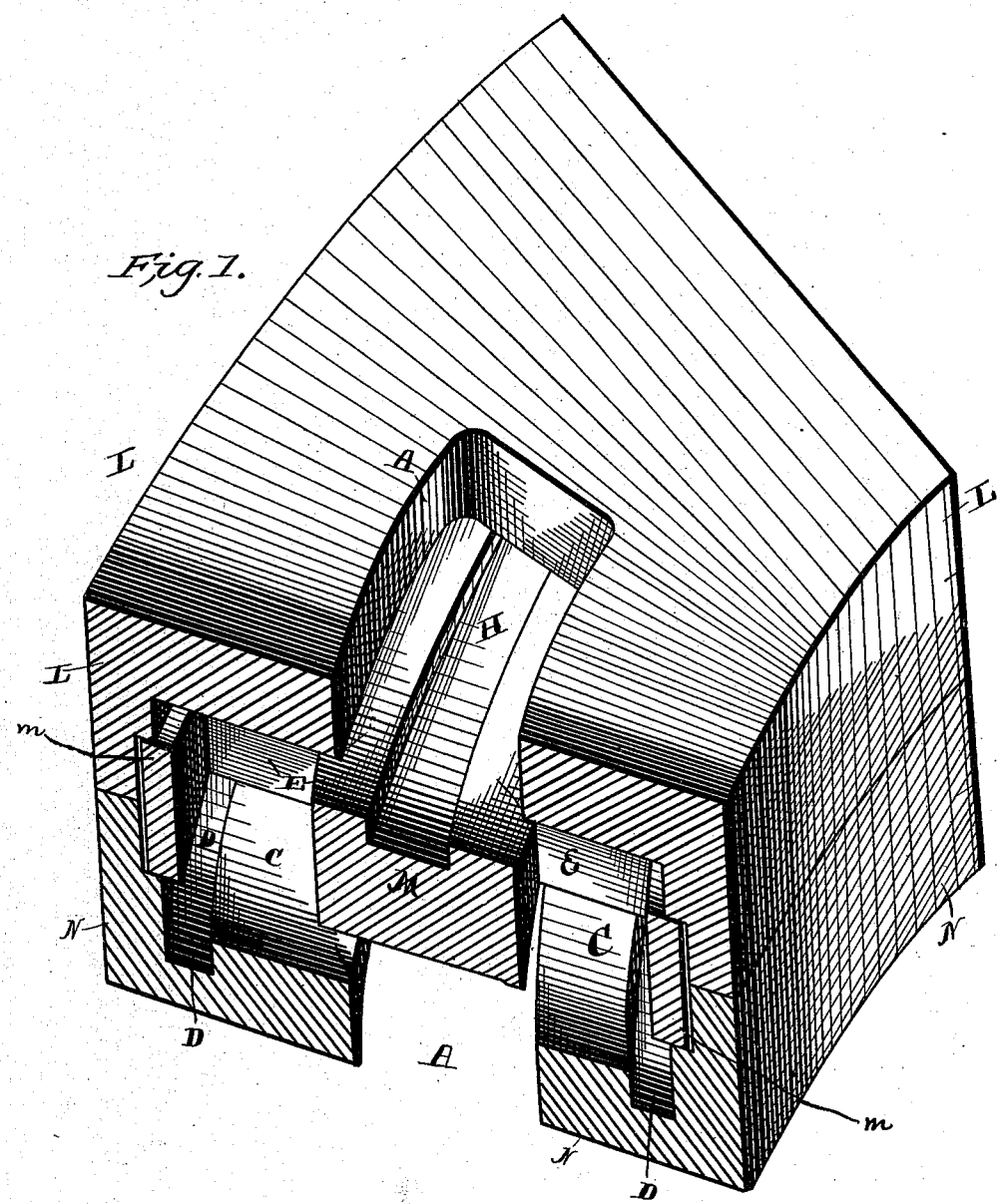

(No Model.)

2 Sheets—Sheet 1.

V. W. BLANCHARD.
BRICK FOR FURNACES.

No. 413,897. Patented Oct. 29, 1889.

WITNESSES:
P. L. Brooks
A. E. Dowell

INVENTOR
Virgil W. Blanchard
BY
T. N. Alexander
ATTORNEY (No Model.) 2 Sheets—Sheet 2.
V. W. BLANCHARD.
BRICK FOR FURNACES.
No. 413,897. Patented Oct. 29, 1889.
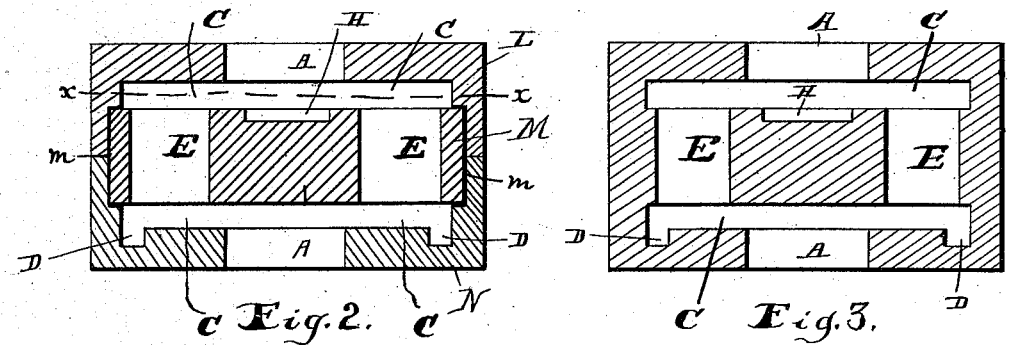
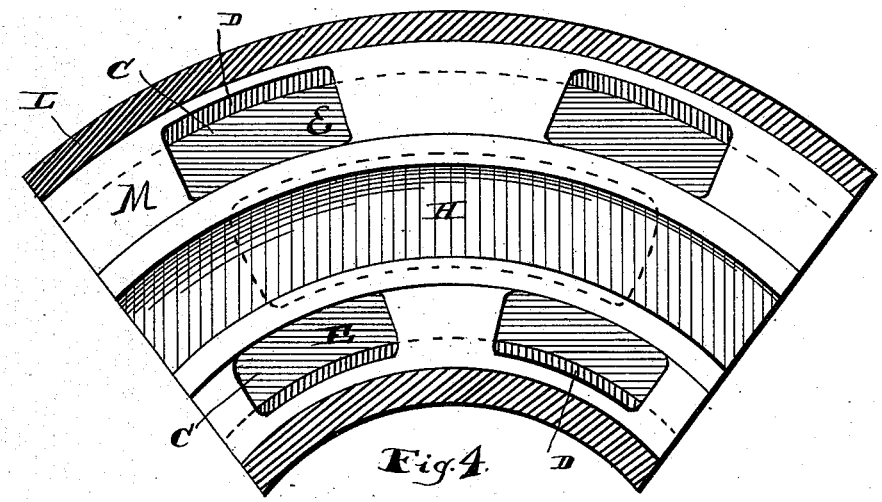
Witnesses
P. L. Brooks
A. E. Sowell
Inventor
V. W. Blanchard
By his Attorney
T. H. Alexander

UNITED STATES PATENT OFFICE.

VIRGIL W. BLANCHARD, OF NEW YORK, N. Y., ASSIGNOR TO JOSEPH A. DAVIS, OF SAME PLACE.

BRICK FOR FURNACES.

SPECIFICATION forming part of Letters Patent No. 413,897, dated October 29, 1889.

Application filed March 29, 1889. Serial No. 305,299. (No model.)

*To all whom it may concern:*

Be it known that I, VIRGIL W. BLANCHARD, of New York, in the county of New York and State of New York, have invented certain new and useful Improvements in Bricks for Furnaces; and I do hereby declare that the following is a full, clear, and exact description thereof, reference being had to the accompanying drawings, and to the letters of reference marked thereon, which form part of this specification, in which—

Figure 1 represents in perspective a half-section of one of my improved furnace-bricks, showing the flues and passages therein for the passage of the hot products of combustion and the traps for the collection and retention of cinders and silicon carried off with the products unconsumed. Fig. 2 is a transverse sectional view of the brick reduced. Fig. 3 is a similar view showing the brick formed integral. Fig. 4 is a horizontal section of brick on line $x$ $x$, Fig. 2, looking down.

This invention relates to certain improvements in the construction of fire-bricks for that class of furnaces in which an intense heat is produced and the heat of the escaping products of combustion stored up in the walls or furnace-lining; and it has for its objects to so construct the bricks used in the construction of the furnace that when properly laid they will form a trap or series of traps wherein the cinders, silica, &c., passing off with the products of combustion will be caught and retained until oxygen sufficient to consume them has been supplied to the traps, whereby an approximately thorough consumption of all the material parts of the fuel is effected and perfect combustion more nearly attained.

The brick is constructed of fire-clay or non-fusible material in one or more parts, preferably, however, for convenience, in three parts L M N, as shown, parts L N being the top and bottom parts of the brick, respectively, and chambered on their inner faces to form horizontal passages, and inclosing between them the part M. The bricks are constructed with central vertical flues or openings A in parts L N, which lead into horizontal annular flues C, having annular traps D at their outer edges in part N, into which the cinders, silica, or other solid products of combustion carried up with the gaseous products passing through the flues are deposited in part. The flues in parts L N are partially separated by the intermediate part M, which rest in rabbets $m$ in the edges of parts N and L. Flues C connect with the next vertical flue A above by vertical flues E in part M, the intermediate partition or wall of part M between openings E E being provided at top with an annular well or trap H, into which any cinders, &c., not collected in the aforementioned traps are caught.

As shown in Figs. 1 and 2, the brick is constructed in three parts; but it is evident that by using proper molds it could be constructed in a less number of parts, if desired, being shown as made in one piece in Fig. 3.

In laying the bricks they are placed in layers one above the other in the upper part of the furnace, being arranged annularly, so as to leave a mixing-chamber for the decomposition and consumption of hot gaseous products of combustion in the chamber at the center of the furnace. The flues through the successive layers of bricks are connected with each other, or the bricks are so laid as to form a continuous passage for the hot products of combustion on their way to the chimney, so as to give off their heat to the bricks, in which the heat is stored to be employed for subsequent heating operations.

Having thus described my invention, I claim—

1. A fire-brick composed of an upper chambered part provided with a central flue, a lower chambered part provided with a central flue, and an intermediate partition having flues E E, all substantially as specified.

2. A hollow or chambered brick having the upper and lower horizontal passages C C, the interior partition having flues E E and trap H, and the vertical passages A A, all substantially as and for the purpose described.

3. The fire-brick composed of an upper chambered part L, provided with a central flue, a lower chambered part N, formed with a central vertical flue and cinder-traps, and a partition M, interposed between parts L and N and having flues E E and trap H, all substantially as described.

In testimony that I claim the foregoing as my own I affix my signature in presence of two witnesses.

VIRGIL W. BLANCHARD.

Witnesses:
   CHAS. R. CLARKE,
   THOS. M. WYATT.